United States Patent
Bassoff

[11] 3,717,044
[45] Feb. 20, 1973

[54] INDEX DEVICE

[75] Inventor: Arthur B. Bassoff, Oak Park, Mich.

[73] Assignee: Lear Siegler, Inc., Santa Monica, Calif.

[22] Filed: Feb. 4, 1971

[21] Appl. No.: 112,705

[52] U.S. Cl................74/142, 74/825, 74/813 R
[51] Int. Cl..............................F16h 27/02
[58] Field of Search........74/142, 143, 144, 126, 128, 74/813, 825

[56] References Cited

UNITED STATES PATENTS

| 3,141,356 | 7/1964 | Herbkersman | 74/142 |
| 3,242,746 | 3/1966 | Seiden | 74/142 |
| 3,020,774 | 2/1962 | Kullmann | 74/143 |
| 3,475,981 | 11/1969 | Gerard | 74/143 |

*Primary Examiner*—Milton Kaufman
*Assistant Examiner*—Wesley S. Ratliff, Jr.
*Attorney*—Whittemore, Hulbert & Belknap

[57] ABSTRACT

An index device including a locating or indexing pawl and a driving pawl, and means for effecting timed engagement and disengagement between said pawls and an index plate to maintain positive control of the index plate at all times.

9 Claims, 2 Drawing Figures

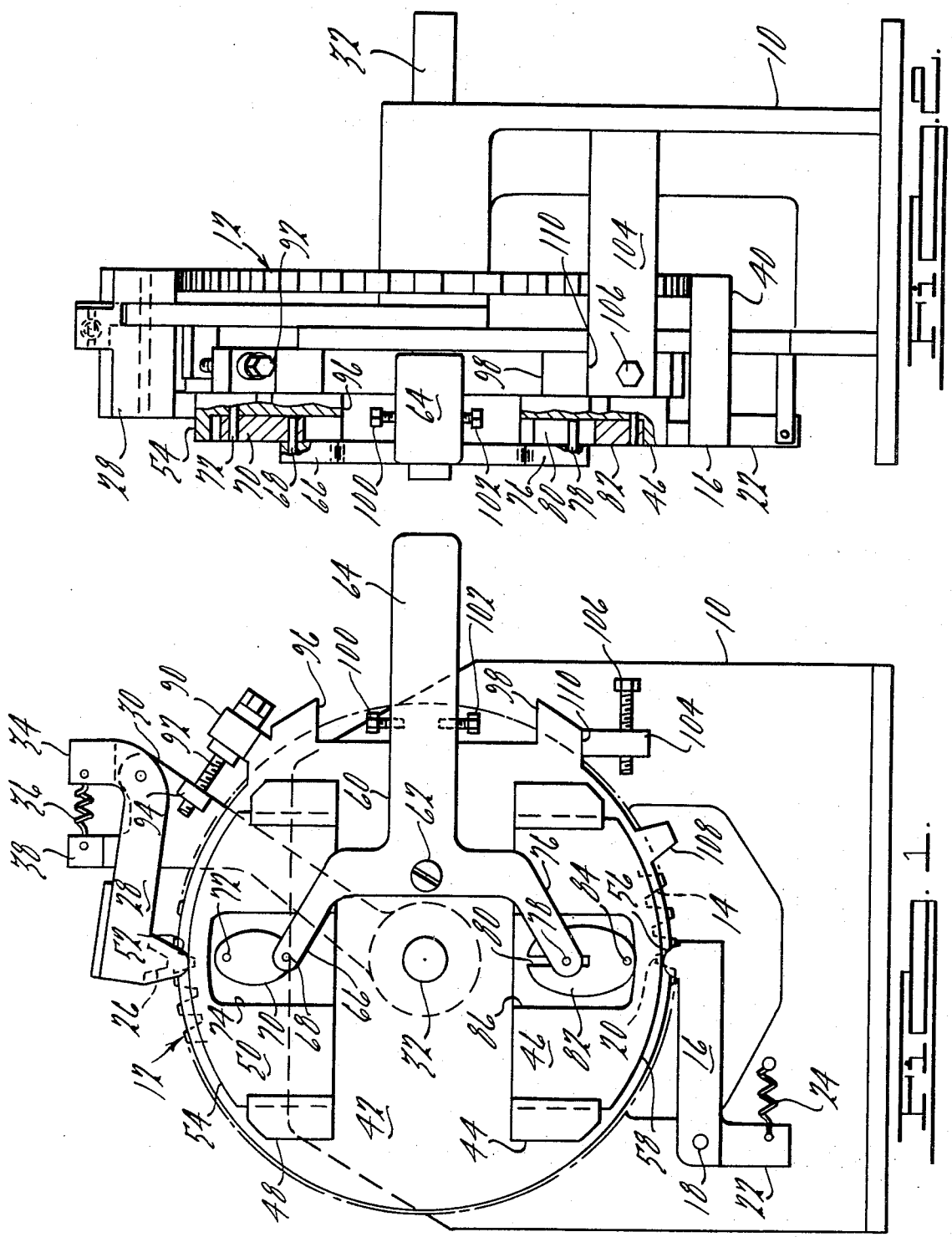

INDEX DEVICE

BRIEF SUMMARY OF THE INVENTION

The index device comprises a toothed index plate mounted for rotation and having adjacent its periphery a locating pawl movable into and out of engagement with selected notches or recesses on the index plate. A predetermined rotation of the plate is effected by means comprising a driver having a driving pawl carried thereby and movable into and out of engagement with selected notches on the periphery of the plate. Means are provided for engaging the pawl on the driver with the plate before the locating pawl is released, and vice-versa. After the indexing pawl has engaged in a notch on the index plate, the locating pawl is removed, leaving the index plate free for rotation by the driving pawl. The driver is then rotated an adjustably predetermined increment.

The driver includes connections to means for effecting sequential release and engagement of the pawls. After the driver has been moved to index position it is moved reversely, this movement effecting sequential engagement of the locator pawl and disengagement of the driving pawl.

With the foregoing arrangement the index plate is at all times engaged either with the locator pawl or with the driver pawl so that it is always under positive control.

BRIEF DESCRIPTION OF THE DRAWING

FIG. 1 is a front elevation of the index device.

FIG. 2 is a side elevation of the device with parts broken away.

DETAILED DESCRIPTION

The index device comprises a frame 10 on which is mounted an index plate 12 having a toothed periphery providing index notches or recesses indicated at 14. Associated with the index plate 12 is a locating lever 16 which is pivoted to the frame 10 as indicated at 18 and which carries a pawl 20 adapted to enter into one of the index notches 14 on the index plate to maintain the plate in a fixed index position. The lever 16 includes an arm 22 to which a spring 24 is connected, urging the pawl 20 into engagement with the index plate.

The means for effecting index rotation of the plate includes mechanism subsequently to be described, nut including a driving pawl 26 carried by a lever 28 which is pivoted to a driver 30 mounted for rotation on the main shaft 32, which establishes the index axis of the device. The lever 28 includes to an arm 34 connected by a spring 36 to an arm 38 on the driver, the spring biasing the lever 28 in a direction to engage the driving pawl 26 in a notch on the index plate 12.

The lever 16, as best seen in FIG. 2, includes a projection 40 to the right hand end of which as seen in FIG. 2, the pawl 20 is connected for engagement with the index pate 12.

Mounted for rotation about the axis of the shaft 32 is an oscillator disc 42 provided with ways 44 adapted to mount a cam plate 46 for vertical movement as seen in FIG. 1. The oscillator disc 42 is further provided with ways 48 mounting a cam plate 50 for movement vertically as seen in FIG. 1.

The lever 28 which carries a driving pawl 26 also carries a rounded projection 52 engageable with an arcuate surface 54 on the cam plate 50. The arrangement is such that as the cam plate 50 is moved vertically downwardly from the position illustrated in FIG. 1, the pawl 26 is permitted to move downwardly and drop into a notch on the index plate 12.

Similarly, the lever 16 is provided with a rounded projection 56 engageable with an arcuate surface 58 on the cam plate 46. The arrangement is such that when the cam plate 46 is moved downwardly from the illustrated position in FIG. 1, the locating pawl 20 is moved outwardly of the adjacent notch or recess in the index plate, freeing the index plate for index rotation.

The means for effecting index rotation of the index plate and controlling the necessary sequential movement of the cam plates 46 and 50 comprises an actuator arm 60 pivoted as indicated at 62 on the oscillator disc 42. It includes an arm 64 by means of which it is moved in its indexing movement, and means are provided for coupling it to the cam plates 46 and 50 and to the driver 30.

The actuator 60 includes an arm 66 which is pivoted as indicated at 68 to a link 70 which in turn is pivoted as indicated at 72 in a recess 74 formed in one side of the cam plate 50. It will be apparent that if the lever 64 is swung counterclockwise downward movement of the pivot connection 68 in an arcuate path about the pivot 62 will move the cam plate 50 downwardly.

The connection between the actuator 60 and the cam plate 46 is similar but specifically different. In this case the actuator arm 76 is provided with a pin 78 movable in a slot 80 formed in a link 82 which is pivoted as indicated at 84 in a shallow pocket 86 formed in the side of the cam plate 46. With this arrangement counterclockwise movement of the actuator 60 will first swing the link 82 in a clockwise direction about its pivot 84 until a side of the link 82 engages the right hand side of the recess 86 as seen in FIG. 1. Continued movement of the actuator 60 will move the cam plate 46 downwardly, thus forcing the locating pawl 20 out of the adjacent notch of the index plate 12.

By properly selecting the dimensions of the constructions interconnecting the actuator 60 to the cam plates, the necessary sequential action is readily obtainable. The necessary action is of course that the driving pawl 26 must engage in a recess of the index plate before the index plate is released for rotation by removal of the index pawl 20 therefrom. Upon completion of the index operation the converse is of course required; namely, that the index pawl enter into the appropriate notch in the index plate before the driving pawl 26 moves out of a notch on the index plate, preparatory to movement of the index pawl to position to enter into the next appropriate index notch on the plate.

The oscillator disc 42 has a projecting arm 90 carrying an adjusting screw 92 which couples the oscillator disc to the driver 30. The screw 92 enters a threaded nut 94 on the driver 30 and serves the additional function of providing for circumferential adjustment of the driving pawl 26 so that it is in proper registration with an adjacent index recess or notch in the index plate 12.

The oscillator disc 42 is adapted to be oscillated by movement of the actuator 60 and for this purpose the oscillator disc is provided with abutments 96 and 98 which are adapted to be engaged by adjustable abutment screws 100 and 102 respectively carried by the lever 64 of the actuator.

The stationary frame 10 carries a boss 104 carrying an adjustable abutment screw 106 which is engageable by a projection 108 formed on the oscillator disc 42. The boss 104 also is engageable by a surface 110 to locate the oscillator disc 42 in the position illustrated in FIG. 1.

OPERATION

With the parts in the indexed position illustrated in FIG. 1 and with the index plate 12 retained in accurately index position by the indexed pawl 20, the indexing operation is initiated by swinging the actuator 60 in a counterclockwise direction about the pivot mounting 62 by means of which it is connected to the oscillator disc 42. This initial movement of the actuator 60 causes the arm 66 and link 70 to pull the cam plate 50 downwardly to a point where the driving pawl 26 enters into an adjacent recess in the index plate 12. Continued movement of the actuator 60 next effects downward movement of the cam plate 46. Specifically, this is caused by first swinging the link 82 about its pivot 84 until the right hand side of the link, as seen in FIG. 1, engages the side wall of the recess 86. This movement is of course permitted by reason of the elongated slot 80 in the link. Thereafter, further swinging movement of the actuator 60 forces the cam plate 46 downwardly and through its engagement with the rounded projection 56, swings the lever 16 so as to retract the index pawl 20 from the index plate. Thereafter, the adjustable abutment screw 100 engages the surface 96 on the oscillator disc 42 and will rotate the oscillator disc counterclockwise until its movement is arrested by engagement between projection 108 and stop screw 106. Movement of the oscillator disc 42 is of course imparted to the driver 30 and from it to the lever 28 and driving pawl 26. When the projection 108 engages the adjustable stop screw 106, the appropriate notch of the index plate is in registration with the retracted index pawl 20. At this time, clockwise movement of the actuator 60 results first in releasing the cam plate 46 so that the index or locator pawl 20 may be moved by the spring 24 into proper indexing relation with the associated notch in the index plate. This of course firmly secures the indexed plate in index position. Further movement of the actuator 60 results in moving the cam plate 50 upwardly so as to disengage the driving pawl 26 from the index plate. Thereafter, further movement of the actuator 60 swings the oscillator disc 42 in a clockwise direction until such movement is terminated by engagement between the surface 110 thereon with the boss 104, at which time the driving pawl 26 will be in proper registration with the next recess on the index plate to be engaged in the next following index operation.

With the foregoing construction it will be observed that simple connections to the means for controlling the position of the index or locating pawl and the driving pawl insures that the driving pawl is engaged in a recess in the index plate prior to disengagement of the index pawl and that conversely, after indexing movement the index pawl is moved into engagement in the appropriate recess in the index plate before the driving pawl is retracted.

The actuator 60 may be operated manually although the mechanism is of course capable of being connected to suitable automatic means for effecting movement of the actuator 60 automatically in timed relation to a sequence of machine operations such for example as strokes of a gear grinding machine.

It will be apparent that while the mechanism has been illustrated and described for performing indexing operations resulting in counterclockwise index movement of the index plate as seen in FIG. 1, the device may be readily adapted for changeover for effecting index movements in the opposite direction.

What I claims as my invention is:

1. An index device comprising a frame, an index plate having peripheral index notches, means supporting said plate for rotation about the index axis on said frame, an index pawl movable on said frame into and out of indexing engagement with a sequence of notches on said plate, an oscillator mounted on said frame for oscillation about the index axis, abutment means acting between said frame and said oscillator and limiting movement of said oscillator relative to said frame, a driving pawl operatively connected to said oscillator and movable relative thereto into and out of driving relation with a notch on said index plate, a separate independently movable pawl control member for each of said pawls, a single actuator, and means operatively connecting said actuator to said pawl control members and to said oscillator and operable upon movement of said actuator in one direction from a first position to a second position determined by said abutment means to effect timed operation of said pawl control members and said oscillator to first engage said driving pawl in a notch on said index plate, then to disengage said index pawl from a notch on said index plate, and thereafter to couple said actuator and said oscillator together for simultaneous movement and to move said oscillator and said index plate through a distance determined by said abutment means to effect index rotation of said index plate and operable upon movement of said actuator in the opposite direction from said second position to said first position, to first engage said index pawl in a notch of said index plate, then to retract said driving pawl from a notch in said index plate, and finally to reversely move said oscillator to move said driving pawl into registration with a different notch of said index plate.

2. A device as defined in claim 1, in which said oscillator comprises a plate mounted for rotation about the index axis of said device.

3. A device as defined in claim 1 in which the pawl control members are cams mounted on said oscillator, and links connecting said actuator to said cams to provide sequential operation thereon.

4. A device as defined in claim 3 in which one of said links has fixed pivot connections with said actuator and the cam which it controls, the other of said links having a lost motion connection to said actuator to provide delay in movement thereof.

5. A device as defined in claim 4, in which the lost motion connection to said other link comprises a pin and slot connection with said actuator.

6. A device as defined in claim 5, said other link being pivotally received in a recess in the pawl with which it is associated, the recess being dimensioned to have a surface engageable by said other link to prevent further movement between said one link and its cam.

7. A device as defined in claim 1 comprising adjustable abutment means acting between said actuator and said oscillator to provide for initial relative movement between said oscillator and actuator to provide for movement of said pawls prior to movement of said oscillator.

8. A device as defined in claim 7 comprising adjustable abutment means acting between said frame and oscillator to provide for determining the amount of index rotation of said index plate.

9. A device as defined in claim 7 comprising a driver mounted for angular movement about the index axis of said device, adjustable means fixedly coupling said driver to said oscillator, said driving pawl being carried by said driver.

* * * * *